(12) United States Patent
Knausz et al.

(10) Patent No.: US 9,128,713 B2
(45) Date of Patent: Sep. 8, 2015

(54) METHOD AND CIRCUIT TO OPTIMIZE N-LINE LCD POWER CONSUMPTION

(71) Applicant: Synaptics Incorporated, Santa Clara, CA (US)

(72) Inventors: Imre Knausz, Fairport, NY (US); Brian Mott, Rochester, NY (US); John Childs, Rochester, NY (US)

(73) Assignee: SYNAPTICS INCORPORATED, San Jose, CA (US)

( * ) Notice: Subject to any disclaimer, the term of this patent is extended or adjusted under 35 U.S.C. 154(b) by 331 days.

(21) Appl. No.: 13/742,263

(22) Filed: Jan. 15, 2013

(65) Prior Publication Data

US 2014/0198087 A1     Jul. 17, 2014

(51) Int. Cl.
| | |
|---|---|
| G09G 5/00 | (2006.01) |
| G06F 1/32 | (2006.01) |
| G06F 3/041 | (2006.01) |
| G06F 3/044 | (2006.01) |
| G09G 3/36 | (2006.01) |

(52) U.S. Cl.
CPC .............. *G06F 1/3218* (2013.01); *G06F 3/041* (2013.01); *G06F 3/044* (2013.01); *G06F 3/0412* (2013.01); *G06F 3/0416* (2013.01); *G09G 3/3688* (2013.01); *G09G 3/3614* (2013.01); *G09G 2310/0291* (2013.01); *G09G 2310/0297* (2013.01); *G09G 2330/023* (2013.01)

(58) Field of Classification Search
CPC ............... G09G 2310/0248; G09G 2310/0251
USPC ....................... 345/209, 210, 54, 96
See application file for complete search history.

(56) References Cited

U.S. PATENT DOCUMENTS

| | | | |
|---|---|---|---|
| 6,680,720 B1 * | 1/2004 | Lee et al. ......................... | 345/90 |
| 8,081,150 B2 | 12/2011 | An | |
| 2009/0085858 A1 * | 4/2009 | Hsu et al. ....................... | 345/100 |

FOREIGN PATENT DOCUMENTS

| | | | | |
|---|---|---|---|---|
| WO | WO2007034353 | * | 3/2007 | ............... G09G 3/36 |
| WO | WO-2007034353 A2 | | 3/2007 | |

* cited by examiner

*Primary Examiner* — Ram Mistry
(74) *Attorney, Agent, or Firm* — Patterson + Sheridan, LLP

(57) ABSTRACT

Embodiments of the invention generally provide an input device that includes one or more source drivers that are coupled to a display screen. Specifically, one of the source drivers may be coupled to a plurality of source lines (or column lines) on the display screen which the source driver uses to set voltages associated with one or more sub-pixels that determine the color displayed by the pixel. When driving voltages onto subsequent source lines, the input device may precharge the source driver using a latent voltage stored on the source lines. That is, if the source line was previously driven to a particular voltage by the source driver, the input device uses that latent voltage to precharge the output of the source driver to the same voltage. The source driver may then adjust its output to a desired voltage and drive the desired voltage onto the source line and sub-pixel.

14 Claims, 9 Drawing Sheets

N-LINE INVERSION (N = 1)

FRAME i 505

FRAME i + 1 510

FIG. 5A

N-LINE INVERSION (N = 2)

FRAME i 515

FRAME i + 1 520

FIG. 5B

N-LINE INVERSION (N = 3)

FRAME i 525

FRAME i + 1 530

R1 G1 B1 | R2 G2 B2
SOURCE DRIVER 1 | SOURCE DRIVER 2

FIG. 5C

METHOD AND CIRCUIT TO OPTIMIZE N-LINE LCD POWER CONSUMPTION

BACKGROUND OF THE INVENTION

1. Field of the Invention

Embodiments of the present invention generally relate to conserving power when driving voltages onto source lines in a display screen, and more specifically, to precharging a source driver using a latent voltage on a source line.

2. Description of the Related Art

Input devices including proximity sensor devices (also commonly called touchpads or touch sensor devices) are widely used in a variety of electronic systems. A proximity sensor device typically includes a sensing region, often demarked by a surface, in which the proximity sensor device determines the presence, location and/or motion of one or more input objects. Proximity sensor devices may be used to provide interfaces for the electronic system. For example, proximity sensor devices are often used as input devices for larger computing systems (such as opaque touchpads integrated in, or peripheral to, notebook or desktop computers). Proximity sensor devices are also often used in smaller computing systems (such as touch screens integrated in cellular phones).

Display panels in input devices typically use source drivers to update the voltage across individual pixels. For example, each source driver may be coupled to multiple source lines. As the source driver iterates between the source lines, the driver may output different voltages for each of the source lines. Moreover, the source lines may already have been charged to a particular voltage from a previous frame update. As the source driver slews from a voltage used to set one source line to another voltage used for setting the voltage on the next source line, the driver may consume power unnecessarily by both decreasing and increasing the voltage already stored on the source line from the previous update.

Therefore, there is a need for ensuring that when updating a source line, the source driver either increases the previous voltage stored on the source line or decreases the previous voltage stored on the source line, but not both.

SUMMARY OF THE INVENTION

One embodiment described herein is a method for updating a display device. The method includes driving a first voltage on a first source line in the display device using an amplifier in a source driver and, after decoupling the source driver from the first source line, disabling the amplifier. The method includes while the amplifier is disabled, coupling the source driver to a second source line in the display device where the second source line was previously charged to a latent voltage. Moreover, the latent voltage alters the charge stored in the precharge circuitry. After altering the charge, the method enables the amplifier such that an output of the amplifier drives a second voltage on the second source line.

Another embodiment described herein is a display driver. The display driver includes a source driver configured to selectively couple to a first source line and a second source line in a display panel. The source driver includes an amplifier, where the source driver is configured to drive a first voltage on the first source line and a second voltage on the second source line using the amplifier. The source driver includes precharge circuitry and amplifier control logic configured to disable the amplifier after the first voltage is driven onto the first source line and the source driver is decoupled from the first source line. Moreover, while the amplifier is disabled, the source driver is configured to alter a charge stored in the precharge circuitry based on a latent voltage previously driven onto the second source line. After altering the charge in the precharge circuitry, the amplifier control logic is configured to enable the amplifier such that an output of the amplifier drives the second voltage onto the second source line.

Another embodiment described herein is a display device including a display panel and a source driver. The display panel includes a first source line, and second source line, and a selection element where the source driver is selectively coupled to the first and second source line via the selection element. The source driver includes an amplifier configured to drive a first voltage on the first source line and a second voltage on the second source line. The source driver includes precharge circuitry and amplifier control logic configured to disable the amplifier after the first voltage is driven onto the first source line and the source driver is decoupled from the first source line using the selection element. While the amplifier is disabled, the selection element is configured to couple the second source line to the precharge circuitry to alter a charge stored in the precharge circuitry based on a latent voltage previously driven onto the second source line. After altering the charge in the precharge circuitry, the amplifier control logic is configured to enable the amplifier such that an output of the amplifier drives the second voltage onto the second source line.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

FIGS. 5A-5C illustrate inversion schemes for a display device, according to embodiments described herein.

Figure 1:
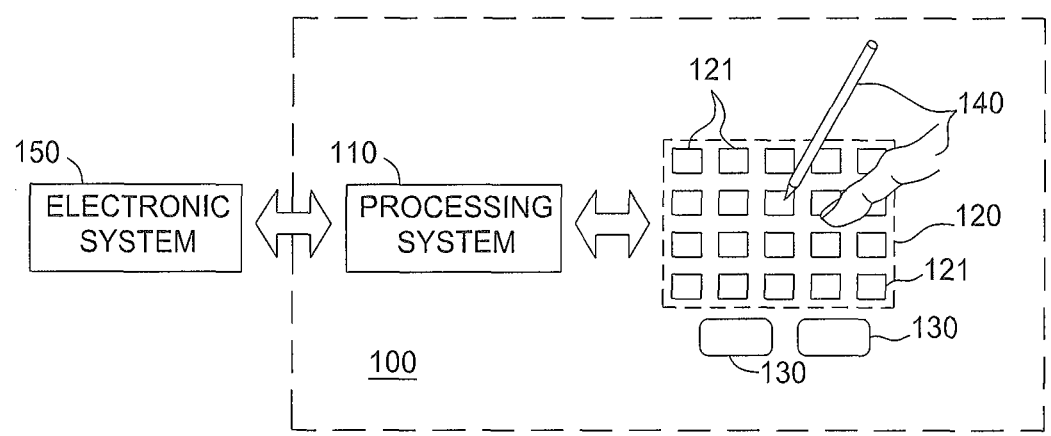
FIG. 1 is a schematic block diagram of an exemplary input device, according to an embodiment described herein.

To facilitate understanding, identical reference numerals have been used, where possible, to designate identical elements that are common to the figures. It is contemplated that elements disclosed in one embodiment may be beneficially utilized on other embodiments without specific recitation. The drawings referred to here should not be understood as being drawn to scale unless specifically noted. Also, the drawings are often simplified and details or components omitted for clarity of presentation and explanation. The drawings and discussion serve to explain principles discussed below, where like designations denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Various embodiments of the present technology provide input devices and methods for improving usability. Input devices may include one or more source drivers that are coupled to a display screen. Specifically, one of the source drivers may be selectively coupled to a plurality of source lines (or column lines) on the display screen. Using the source lines, the source driver sets a voltage associated with a pixel on the display screen which determines the color displayed by the pixel. When the source driver sets voltages onto subsequent source lines, the input device may precharge the source driver using a latent voltage stored on the source line. That is, if the source line was previously driven to a particular voltage by the source driver, the input device uses that latent voltage to precharge the output of the source driver to the same voltage. The source driver may then adjust its output to the desired voltage—i.e., the pixel voltage stipulated by a received display frame. For example, if the latent voltage on the source line is 4.5V, after the precharge stage, the output of the source driver is also set at 4.5V. The source driver then slews to the desired voltage (e.g., 5V) thereby driving the desired voltage onto the pixel coupled to the source line.

Precharging the source driver may reduce the power consumed by the source driver. For example, assume the desired voltage for a pixel is 5V but the current output voltage of the source driver is 0V; thus, the source driver must slew from 0V to the desired 5V. However, if the source line associated with the pixel already has a latent voltage of, e.g., 4.5V, when the source line is coupled to the slewing source driver, the driver may pull down the latent voltage on the source line. Eventually, the output voltage of the source driver will exceed the voltage of the source line and drive the source line to the desired 5V. Nonetheless, while slewing, the source driver may consume energy to both drive down the latent voltage and drive up the voltage on the source line to the desired voltage. Driving down the voltage to only drive up the voltage is unnecessary and wastes power. Precharging the source driver may avoid wasting power by setting the output voltage of the driver to the latent voltage of the source line before the source drive slews to the desired voltage.

In one embodiment, instead of precharging the source driver using a source line, the source driver may remain decoupled from the source line until the driver's output voltage reaches the desired voltage based on a source driver input voltage (i.e., the source driver is precharged using the input voltage). Alternatively, precharging the source driver by coupling the source driver's output to a source line may require less time than using the input voltage (i.e., the value that sets the desired voltage) to precharge the source driver. Accordingly, precharging the source driver using the latent voltage on a connected source line may both reduce the power consumed by the source driver and require less time to precharge the source driver relative to an input device that precharges using the input voltage of the source driver.

FIG. 1 is a block diagram of an exemplary input device 100, in accordance with embodiments of the present technology. Although embodiments of the present disclosure may be utilized in an input device 100 including a display device integrated with a sensing device, it is contemplated that the invention may be embodied in display devices without integrated sensing devices. The input device 100 may be configured to provide input to an electronic system (not shown). As used in this document, the term "electronic system" (or "electronic device") broadly refers to any system capable of electronically processing information. Some non-limiting examples of electronic systems include personal computers of all sizes and shapes, such as desktop computers, laptop computers, netbook computers, tablets, web browsers, e-book readers, and personal digital assistants (PDAs). Additional example electronic systems include composite input devices, such as physical keyboards that include input device 100 and separate joysticks or key switches. Further example electronic systems include peripherals such as data input devices (including remote controls and mice), and data output devices (including display screens and printers). Other examples include remote terminals, kiosks, and video game machines (e.g., video game consoles, portable gaming devices, and the like). Other examples include communication devices (including cellular phones, such as smart phones), and media devices (including recorders, editors, and players such as televisions, set-top boxes, music players, digital photo frames, and digital cameras). Additionally, the electronic system could be a host or a slave to the input device.

The input device 100 can be implemented as a physical part of the electronic system, or can be physically separate from the electronic system. As appropriate, the input device 100 may communicate with parts of the electronic system using any one or more of the following: buses, networks, and other wired or wireless interconnections. Examples include I²C, SPI, PS/2, Universal Serial Bus (USB), Bluetooth, RF, and IRDA.

In FIG. 1, the input device 100 is shown as a proximity sensor device (also often referred to as a "touchpad" or a "touch sensor device") configured to sense input provided by one or more input objects 140 in a sensing region 120. Example input objects include fingers and styli, as shown in FIG. 1.

Sensing region 120 encompasses any space above, around, in and/or near the input device 100 in which the input device 100 is able to detect user input (e.g., user input provided by one or more input objects 140). The sizes, shapes, and locations of particular sensing regions may vary widely from embodiment to embodiment. In some embodiments, the sensing region 120 extends from a surface of the input device 100 in one or more directions into space until signal-to-noise ratios prevent sufficiently accurate object detection. The distance to which this sensing region 120 extends in a particular direction, in various embodiments, may be on the order of less than a millimeter, millimeters, centimeters, or more, and may vary significantly with the type of sensing technology used and the accuracy desired. Thus, some embodiments sense input that comprises no contact with any surfaces of the input device 100, contact with an input surface (e.g. a touch surface) of the input device 100, contact with an input surface of the input device 100 coupled with some amount of applied force or pressure, and/or a combination thereof. In various embodiments, input surfaces may be provided by surfaces of casings within which the sensor electrodes reside, by face sheets applied over the sensor electrodes or any casings, etc.

In some embodiments, the sensing region 120 has a rectangular shape when projected onto an input surface of the input device 100.

The input device 100 may utilize any combination of sensor components and sensing technologies to detect user input in the sensing region 120. The input device 100 comprises one or more sensing elements 121 for detecting user input. As several non-limiting examples, the input device 100 may use capacitive, elastive, resistive, inductive, magnetic acoustic, ultrasonic, and/or optical techniques.

Some implementations are configured to provide images that span one, two, three, or higher dimensional spaces. Some implementations are configured to provide projections of input along particular axes or planes.

In some resistive implementations of the input device 100, a flexible and conductive first layer is separated by one or more spacer elements from a conductive second layer. During operation, one or more voltage gradients are created across the layers. Pressing the flexible first layer may deflect it sufficiently to create electrical contact between the layers, resulting in voltage outputs reflective of the point(s) of contact between the layers. These voltage outputs may be used to determine positional information.

In some inductive implementations of the input device 100, one or more sensing elements 121 pick up loop currents induced by a resonating coil or pair of coils. Some combination of the magnitude, phase, and frequency of the currents may then be used to determine positional information.

In some capacitive implementations of the input device 100, voltage or current is applied to create an electric field. Nearby input objects cause changes in the electric field, and produce detectable changes in capacitive coupling that may be detected as changes in voltage, current, or the like.

Some capacitive implementations utilize arrays or other regular or irregular patterns of capacitive sensing elements 121 to create electric fields. In some capacitive implementations, separate sensing elements 121 may be ohmically shorted together to form larger sensor electrodes. Some capacitive implementations utilize resistive sheets, which may be uniformly resistive.

Some capacitive implementations utilize "self capacitance" (or "absolute capacitance") sensing methods based on changes in the capacitive coupling between sensor electrodes and an input object. In various embodiments, an input object near the sensor electrodes alters the electric field near the sensor electrodes, thus changing the measured capacitive coupling. In one implementation, an absolute capacitance sensing method operates by modulating sensor electrodes with respect to a reference voltage (e.g. system ground), and by detecting the capacitive coupling between the sensor electrodes and input objects.

Some capacitive implementations utilize "mutual capacitance" (or "transcapacitance") sensing methods based on changes in the capacitive coupling between sensor electrodes. In various embodiments, an input object near the sensor electrodes alters the electric field between the sensor electrodes, thus changing the measured capacitive coupling. In one implementation, a transcapacitive sensing method operates by detecting the capacitive coupling between one or more transmitter sensor electrodes (also "transmitter electrodes") and one or more receiver sensor electrodes (also "receiver electrodes"). Transmitter sensor electrodes may be modulated relative to a reference voltage (e.g., system ground) to transmit transmitter signals. Receiver sensor electrodes may be held substantially constant relative to the reference voltage to facilitate receipt of resulting signals. A resulting signal may comprise effect(s) corresponding to one or more transmitter signals, and/or to one or more sources of environmental interference (e.g. other electromagnetic signals). Sensor electrodes may be dedicated transmitter electrodes or receiver electrodes, or may be configured to both transmit and receive.

In FIG. 1, a processing system 110 is shown as part of the input device 100. The processing system 110 is configured to operate the hardware of the input device 100 to detect input in the sensing region 120. The processing system 110 comprises parts of or all of one or more integrated circuits (ICs) and/or other circuitry components. (For example, a processing system for a mutual capacitance sensor device may comprise transmitter circuitry configured to transmit signals with transmitter sensor electrodes, and/or receiver circuitry configured to receive signals with receiver sensor electrodes). In some embodiments, the processing system 110 also comprises electronically-readable instructions, such as firmware code, software code, and/or the like. In some embodiments, components composing the processing system 110 are located together, such as near sensing element(s) of the input device 100. In other embodiments, components of processing system 110 are physically separate with one or more components close to sensing element(s) of input device 100, and one or more components elsewhere. For example, the input device 100 may be a peripheral coupled to a desktop computer, and the processing system 110 may comprise software configured to run on a central processing unit of the desktop computer and one or more ICs (perhaps with associated firmware) separate from the central processing unit. As another example, the input device 100 may be physically integrated in a phone, and the processing system 110 may comprise circuits and firmware that are part of a main processor of the phone. In some embodiments, the processing system 110 is dedicated to implementing the input device 100. In other embodiments, the processing system 110 also performs other functions, such as operating display screens, driving haptic actuators, etc.

The processing system 110 may be implemented as a set of modules that handle different functions of the processing system 110. Each module may comprise circuitry that is a part of the processing system 110, firmware, software, or a combination thereof. In various embodiments, different combinations of modules may be used. Example modules include hardware operation modules for operating hardware such as sensor electrodes and display screens, data processing modules for processing data such as sensor signals and positional information, and reporting modules for reporting information. Further example modules include sensor operation modules configured to operate sensing element(s) to detect input, identification modules configured to identify gestures such as mode changing gestures, and mode changing modules for changing operation modes.

In some embodiments, the processing system 110 responds to user input (or lack of user input) in the sensing region 120 directly by causing one or more actions. Example actions include changing operation modes, as well as GUI actions such as cursor movement, selection, menu navigation, and other functions. In some embodiments, the processing system 110 provides information about the input (or lack of input) to some part of the electronic system (e.g. to a central processing system of the electronic system that is separate from the processing system 110, if such a separate central processing system exists). In some embodiments, some part of the electronic system processes information received from the processing system 110 to act on user input, such as to facilitate a full range of actions, including mode changing actions and GUI actions.

For example, in some embodiments, the processing system 110 operates the sensing element(s) of the input device 100 to produce electrical signals indicative of input (or lack of input) in the sensing region 120. The processing system 110 may perform any appropriate amount of processing on the electrical signals in producing the information provided to the electronic system. For example, the processing system 110 may digitize analog electrical signals obtained from the sensor electrodes. As another example, the processing system 110 may perform filtering or other signal conditioning. As yet another example, the processing system 110 may subtract or otherwise account for a baseline, such that the information reflects a difference between the electrical signals and the baseline. As yet further examples, the processing system 110 may determine positional information, recognize inputs as commands, recognize handwriting, and the like.

"Positional information" as used herein broadly encompasses absolute position, relative position, velocity, acceleration, and other types of spatial information. Exemplary "zero-dimensional" positional information includes near/far or contact/no contact information. Exemplary "one-dimensional" positional information includes positions along an axis. Exemplary "two-dimensional" positional information includes motions in a plane. Exemplary "three-dimensional" positional information includes instantaneous or average velocities in space. Further examples include other representations of spatial information. Historical data regarding one or more types of positional information may also be determined and/or stored, including, for example, historical data that tracks position, motion, or instantaneous velocity over time.

In some embodiments, the input device 100 is implemented with additional input components that are operated by the processing system 110 or by some other processing system. These additional input components may provide redundant functionality for input in the sensing region 120, or some other functionality. FIG. 1 shows buttons 130 near the sensing region 120 that can be used to facilitate selection of items using the input device 100. Other types of additional input components include sliders, balls, wheels, switches, and the like. Conversely, in some embodiments, the input device 100 may be implemented with no other input components.

In some embodiments, the input device 100 comprises a touch screen interface, and the sensing region 120 overlaps at least part of an active area of a display screen of the display device 101. For example, the input device 100 may comprise substantially transparent sensor electrodes overlaying the display screen and provide a touch screen interface for the associated electronic system. The display screen may be any type of dynamic display capable of displaying a visual interface to a user, and may include any type of light emitting diode (LED), organic LED (OLED), cathode ray tube (CRT), liquid crystal display (LCD), plasma, electroluminescence (EL), or other display technology. The input device 100 and the display device 101 may share physical elements. For example, some embodiments may utilize some of the same electrical components for displaying and sensing. As another example, the display device 101 may be operated in part or in total by the processing system 110.

It should be understood that while many embodiments of the present technology are described in the context of a fully functioning apparatus, the mechanisms of the present technology are capable of being distributed as a program product (e.g., software) in a variety of forms. For example, the mechanisms of the present technology may be implemented and distributed as a software program on information bearing media that are readable by electronic processors (e.g., non-transitory computer-readable and/or recordable/writable information bearing media readable by the processing system 110). Additionally, the embodiments of the present technology apply equally regardless of the particular type of medium used to carry out the distribution. Examples of non-transitory, electronically readable media include various discs, memory sticks, memory cards, memory modules, and the like. Electronically readable media may be based on flash, optical, magnetic, holographic, or any other storage technology.

Figure 2:
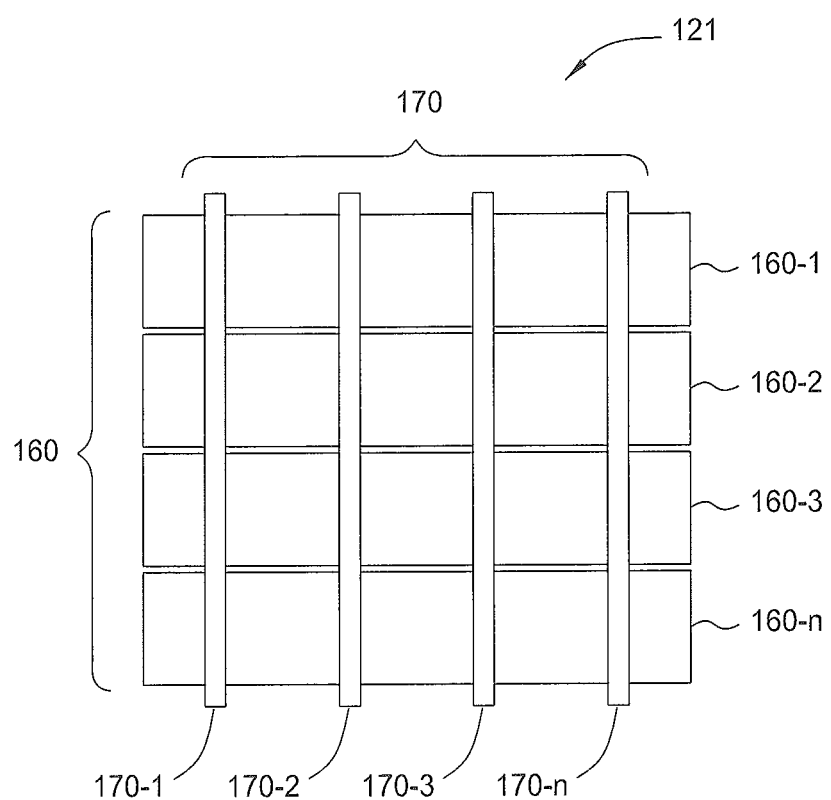
FIG. 2 illustrates a stack-up of a sensor assembly that may be used in the input device to sense the input object, according to an embodiment described herein.

FIG. 2 shows a portion of an exemplary pattern of sensing elements 121 configured to sense in a sensing region associated with the pattern, according to some embodiments. For clarity of illustration and description, FIG. 2 shows the sensing elements 121 in a pattern of simple rectangles, and does not show various components. This pattern of sensing elements 121 comprises a first plurality of sensor electrodes 160 (160-1, 160-2, 160-3, . . . 160-n), and a second plurality of sensor electrodes 170 (170-1, 170-2, 170-3, . . . 170-n) disposed over the plurality of transmitter electrodes 160. In one embodiment, this pattern of sensing elements 121 comprises a plurality of transmitter electrodes 160 (160-1, 160-2, 160-3, . . . 160-n), and a plurality of receiver electrodes 170 (170-1, 170-2, 170-3, . . . 170-n) disposed over the plurality of transmitter electrodes 160. In another embodiment, the first plurality of sensor electrodes may be configured to transmit and receive and the second plurality of sensor electrodes may also be configured to transmit and receive.

Transmitter electrodes 160 and receiver electrodes 170 are typically ohmically isolated from each other. That is, one or more insulators separate transmitter electrodes 160 and receiver electrodes 170 and prevent them from electrically shorting to each other. In some embodiments, transmitter electrodes 160 and receiver electrodes 170 are separated by insulative material disposed between them at cross-over areas; in such constructions, the transmitter electrodes 160 and/or receiver electrodes 170 may be formed with jumpers connecting different portions of the same electrode. In some embodiments, transmitter electrodes 160 and receiver electrodes 170 are separated by one or more layers of insulative material. In some other embodiments, transmitter electrodes 160 and receiver electrodes 170 are separated by one or more substrates; for example, they may be disposed on opposite sides of the same substrate, or on different substrates that are laminated together.

The areas of localized capacitive coupling between transmitter electrodes 160 and receiver electrodes 170 may be termed "capacitive pixels." The capacitive coupling between the transmitter electrodes 160 and receiver electrodes 170 change with the proximity and motion of input objects in the sensing region associated with the transmitter electrodes 160 and receiver electrodes 170.

In some embodiments, the sensor pattern is "scanned" to determine these capacitive couplings. That is, the transmitter electrodes 160 are driven to transmit transmitter signals. Transmitters may be operated such that one transmitter electrode transmits at one time, or multiple transmitter electrodes transmit at the same time. Where multiple transmitter electrodes transmit simultaneously, these multiple transmitter electrodes may transmit the same transmitter signal and effectively produce an effectively larger transmitter electrode, or these multiple transmitter electrodes may transmit different transmitter signals. For example, multiple transmitter electrodes may transmit different transmitter signals according to one or more coding schemes that enable their combined effects on the resulting signals of receiver electrodes 170 to be independently determined.

The receiver sensor electrodes 170 may be operated singly or multiply to acquire resulting signals. The resulting signals may be used to determine measurements of the capacitive couplings at the capacitive pixels.

A set of measurements from the capacitive pixels form a "capacitive image" (also "capacitive frame") representative of the capacitive couplings at the pixels. Multiple capacitive images may be acquired over multiple time periods, and differences between them used to derive information about input in the sensing region. For example, successive capacitive images acquired over successive periods of time can be used to track the motion(s) of one or more input objects entering, exiting, and within the sensing region.

The background capacitance of a sensor device is the capacitive image associated with no input object in the sensing region. The background capacitance changes with the environment and operating conditions, and may be estimated in various ways. For example, some embodiments take "baseline images" when no input object is determined to be in the sensing region, and use those baseline images as estimates of their background capacitances.

Capacitive images can be adjusted for the background capacitance of the sensor device for more efficient processing. Some embodiments accomplish this by "baselining" measurements of the capacitive couplings at the capacitive pixels to produce a "baselined capacitive image." That is, some embodiments compare the measurements forming a capacitance image with appropriate "baseline values" of a "baseline image" associated with those pixels, and determine changes from that baseline image.

In some touch screen embodiments, transmitter electrodes 160 comprise one or more common electrodes (e.g., "V-com electrode" or source drive electrode) used in updating the display of the display screen. These common electrodes may be disposed on an appropriate display screen substrate. For example, the common electrodes may be disposed on the TFT glass in some display screens (e.g., In Plane Switching (IPS) or Plan to Line Switching (PLS)), on the bottom of the color filter glass of some display screens (e.g., Patterned Vertical Alignment (PVA) or Multi-domain Vertical Alignment (MVA)), etc. In such embodiments, the common electrode can also be referred to as a "combination electrode", since it performs multiple functions. In various embodiments, each transmitter electrode 160 comprises one or more common electrodes. In other embodiments, at least two transmitter electrodes 160 may share at least one common electrode.

In various touch screen embodiments, the "capacitive frame rate" (the rate at which successive capacitive images are acquired) may be the same or be different from that of the "display frame rate" (the rate at which the display image is updated, including refreshing the screen to redisplay the same image). In some embodiments where the two rates differ, successive capacitive images are acquired at different display updating states, and the different display updating states may affect the capacitive images that are acquired. That is, display updating affects, in particular, the background capacitive image. Thus, if a first capacitive image is acquired when the display updating is at a first state, and a second capacitive image is acquired when the display updating is at a second state, the first and second capacitive images may differ due to differences in the background capacitive image associated with the display updating states, and not due to changes in the sensing region. This is more likely where the capacitive sensing and display updating electrodes are in close proximity to each other, or when they are shared (e.g. combination electrodes). In various embodiments, the capacitive frame rate is an integer multiple of the display frame rate. In other embodiments, the capacitive frame rate is a fractional multiple of the display frame rate. In yet further embodiments, the capacitive frame rate may be any fraction or integer of the display frame rate.

For convenience of explanation, a capacitive image that is taken during a particular display updating state is considered to be of a particular frame type. That is, a particular frame type is associated with a mapping of a particular capacitive sensing sequence with a particular display sequence. Thus, a first capacitive image taken during a first display updating state is considered to be of a first frame type, a second capacitive image taken during a second display updating state is considered to be of a second frame type, a third capacitive image taken during a first display updating state is considered to be of a third frame type, and so on. Where the relationship of display update state and capacitive image acquisition is periodic, capacitive images acquired cycle through the frame types and then repeats. In some embodiments, there may be "n" capacitive images for every display updating state.

Figure 3:
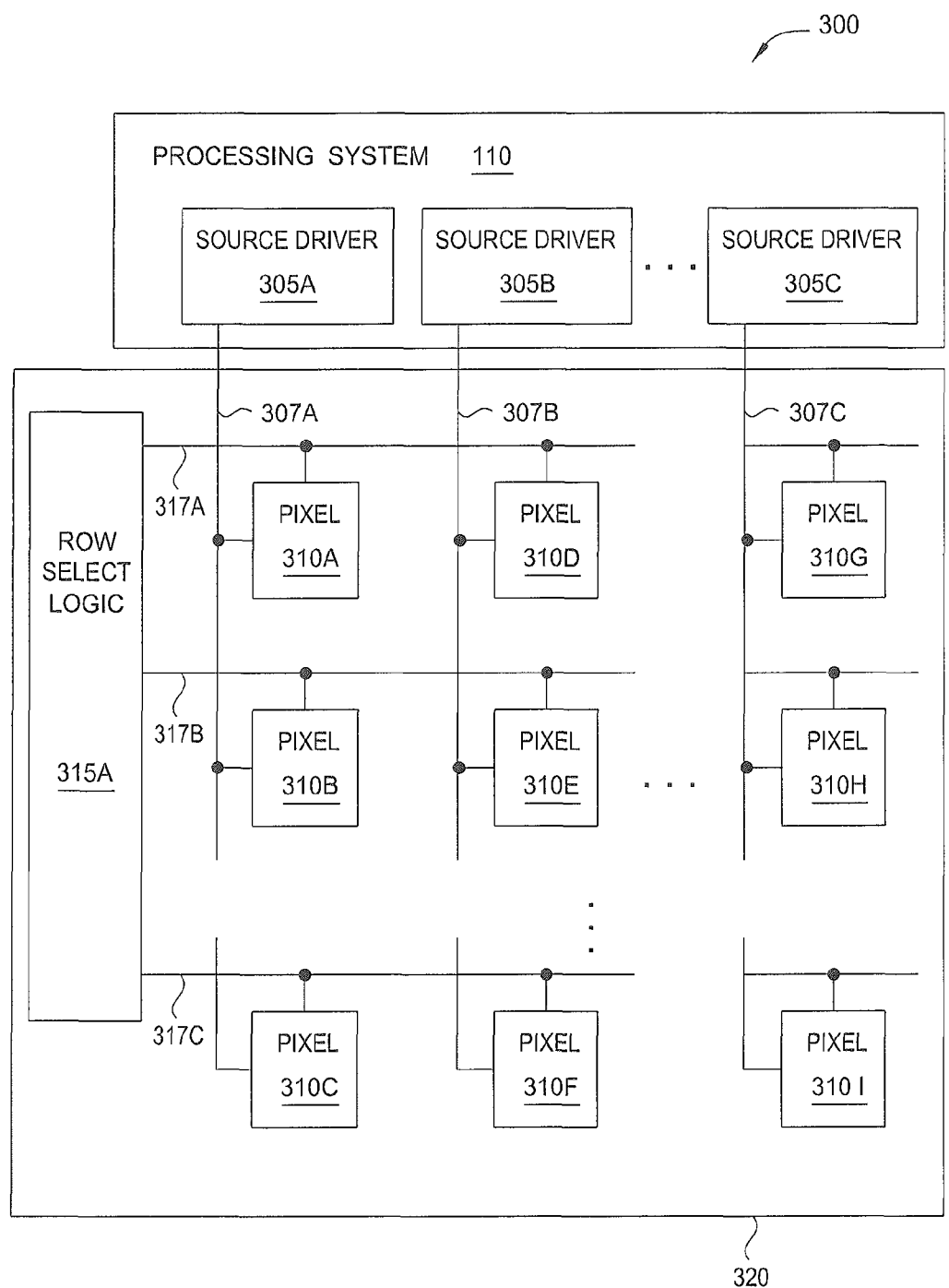
FIG. 3 is a schematic block diagram of a display device, according to one embodiment described herein.

FIG. 3 is a schematic block diagram of a display device 300, according to one embodiment described herein. Specifically, the display device 300 of FIG. 3 may be integrated with an input device 100 and includes processing system 110 and display screen 320. Processing system 110 includes one or more source drivers 305 that are each associated with one or more source lines 307 (also referred to as column lines) in the display screen 320. In one embodiment, processing system 110 and display screen 320 are separate components. For example, the processing system 110 may be an ASIC that is communicatively coupled to the display screen 320 via one or more transmission lines. However, in one embodiment, processing system 110 may be integrated into display screen 320 (e.g., mounted on a common substrate) to form a single component.

The source drivers 305 may receive an input voltage signal which is amplified and transmitted on the source lines 307. Display screen 320 includes one or more pixels 310 coupled to row select logic 315 via respective gate lines 317 (also referred to as row lines). The pixels 310 (in contrast to the capacitive pixels discussed above) may be used to display an image on the display screen 320. The pixels 310 may be used in a light emitting diode (LED), organic LED (OLED), cathode ray tube (CRT), liquid crystal display (LCD), plasma, electroluminescence (EL), or other display technology to display the image.

To update a particular pixel 310, the row select logic 315 activates one of the gate lines 317. In one embodiment, each pixel 310 may contain a switching element that permits the voltage of the source line 307 to change the color emitted by the pixel 310. For example, to update pixel 310D, row select logic 315 using gate line 317A to control the switching element such that the voltage generated by source driver 305B changes the voltage associated with pixel 310D. By coordinating the row select logic 315 with the voltages transmitted by the source drivers 305, the processing system 110 and display screen 320 may set the pixels 310 to respective voltages.

In one embodiment, as discussed above, processing system 110 and display screen 320 may include touch-sensing circuitry and logic for supporting user input. For the sake of clarity, the embodiments provided below do not discuss touch sensing functions. However, these functions are explicitly contemplated. That is, the display circuitry and functions discussed herein may be combined with additional circuitry for enabling user input via touch-sensing.

Figure 4:
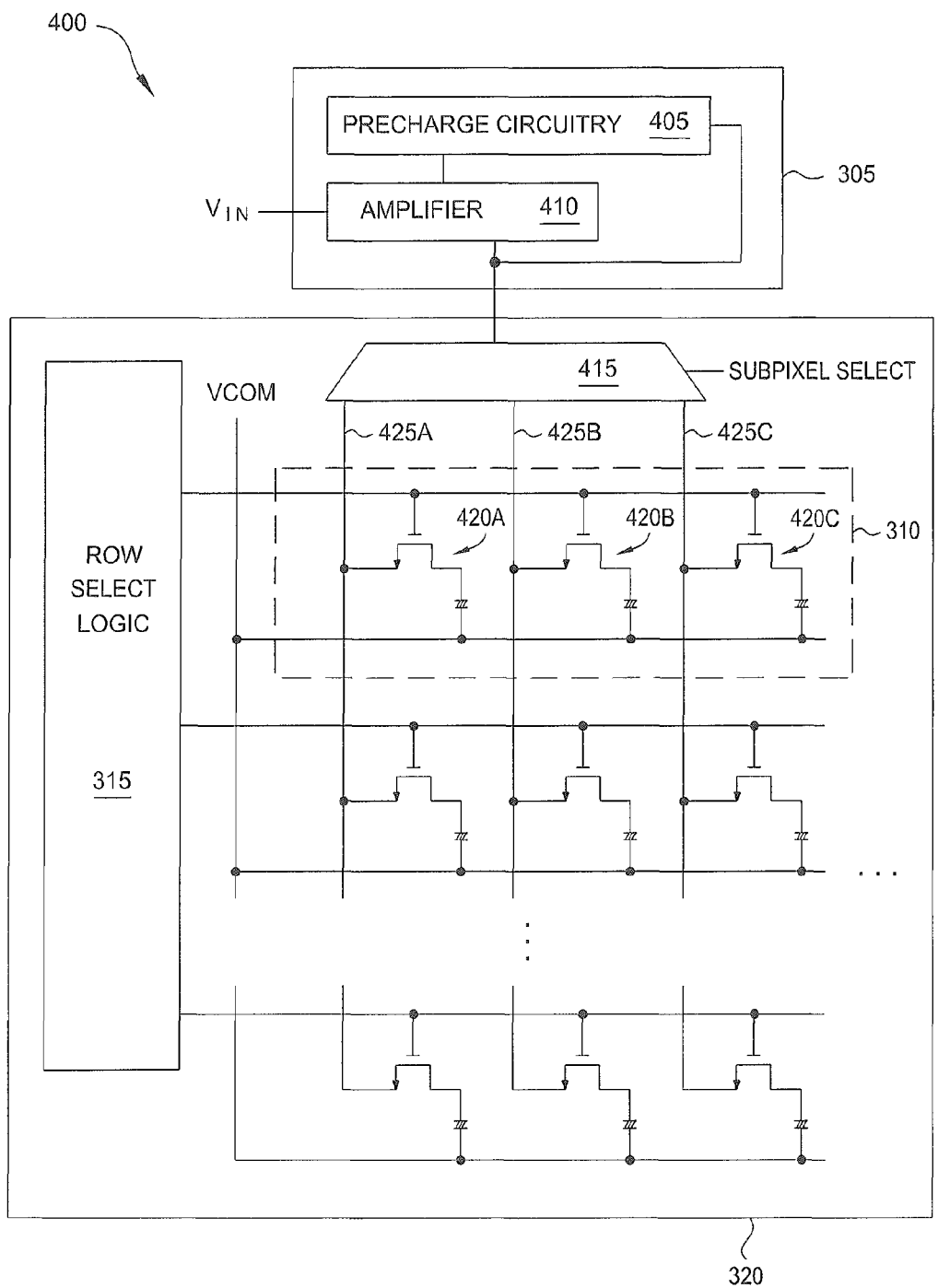
FIG. 4 illustrates a system for updating a source line in a display device, according to one embodiment described herein.

FIG. 4 illustrates a system 400 for updating a source line 425 in a display device, according to one embodiment described herein. Specifically, system 400 includes source driver 305 (i.e., one of the source drivers shown in FIG. 3) coupled to plurality of source lines 425 in display screen 320. As shown here, each source driver 305 is coupled to three source lines 425 which are each associated with a respective sub-pixel 420. In this embodiment, the pixels 310 are divided into three sub-pixels 420 that are combined to provide the color associated with the pixel 310—e.g., sub-pixel 420A is the red sub-pixel, sub-pixel 420B is the green sub-pixel, and sub-pixel 420C is the blue sub-pixel. Accordingly, when setting the voltage, and thus, the color of a pixel 310, source driver 305 may use three separate drive phases, one for each sub-pixel 420. To select between the different sub-pixel source lines 425, display screen 320 include multiplexer (mux) 415. Based on a sub-pixel select signal, mux 415 permits the voltage transmitted by source driver 305 to reach only one of the three source lines 425 at any given time. Thus, each source driver 305 may use only one wire to transmit three unique voltages to each sub-pixel source line 425. Moreover, each pixel is shown including a capacitor representing a liquid crystal pixel, but as discussed above, the display screen is not limited to this type.

Although FIG. 4 illustrates one source driver selectively coupled to three source lines, the present disclosure is not limited to such. Instead, the embodiments described herein may be used in display devices that use a source driver to driver any number of source lines. Moreover, FIG. 4 illustrates using one select signal to couple the source lines 425 to the source driver 305 but in other embodiments it may be preferred to use three different control signals to permit access to the sub-pixels 420. As will be discussed in greater detail below, the three different control signals may be used to interconnect the source lines 425 to each other (e.g., source lines 425A-C are connected to a common reference (VCOM)) to discharge the built up charge.

Source driver 305 includes at least one amplifier 410 and precharge circuitry 405. The amplifier 410 and precharge circuitry 405 may be used to amplify an input signal ($V_{IN}$) which is then transmitted onto a respective source line 425 to set the voltage of a sub-pixel. That is, to update a pixel 310, a source driver 305 may receive three different input voltages for setting the three sub-pixels 420 making up the pixel 310. In one embodiment, the precharge circuitry 405 may be used to ensure that the output of the source driver 305 provides the desired voltage onto the source lines 425.

FIGS. 5A-5B illustrate inversion schemes for a display device, according to embodiments described herein. Specifically, graphs 505, 510, 515, 520, 525, and 530 illustrate the polarity assigned to different pixels (or sub-pixels) in the display screen. In one embodiment, the display screen may use an inversion scheme to apply a net voltage of substantially zero across two display frames (where the data stays the same). Although FIGS. 5A-5B illustrate an N-line inversion scheme, any inversion scheme (e.g., dot inversion, frame inversion, and the like) are within the scope of the embodiments discussed herein.

The boxes in charts 505-530 represent the assigned polarity of a corresponding pixel. In charts 505 and 510, each pixel is assigned a polarity that is different from an adjacent pixel—i.e., N=1. Typically, the voltage set on the sub-pixels ranges between −5 to 5V. Because the same color is produced regardless whether the sub-pixel of a pixel are set to a positive voltage or a negative voltage (e.g., the color is the same if the sub-pixel is set to −3V or 3V), the display screen may change the polarity of the voltage used without affecting the displayed color. N-line inversion is an inversion scheme where the polarity switches every N rows. Thus, in chart 505 where N=1, the polarity of the pixels in one row is different than the polarity of the pixels in the adjacent rows. When a subsequent frame is received, however, the polarity for each pixel is swapped. By swapping the polarities, the display screen may improve the image quality and reduce any noise that may affect other systems in a device such as touch sensing. Specifically, N-line inversion (as well as other inversion schemes) may reduce VCOM noise because most of the VCOM currents cancel locally resulting in much less voltage deviation on VCOM which reduces noise coupled into the system on this electrode.

Chart 510 illustrates the assigned polarity for the subsequent frame—i.e., i+1. As shown, the polarity of each pixel has switched; however, the polarity assignments are still opposite for each adjacent row. Notably, when N=1, the N-line inversion scheme behaves like a dot inversion scheme.

Charts 515 and 520 illustrate the N-line inversion scheme when N=2. Here, every two rows of pixels have the same polarity assignments. For example, assume that a signal source driver was assigned to drive the voltages on the six columns (or source lines) shown in chart 515. After updating the first row of pixels, the six source lines will have a latent charge. Specifically, the first source line will have a positive voltage, the second source line will have a negative voltage, and so forth. When updating the second row, the source driver again will charge the first source line to a positive voltage to set the first pixel in the second (although this voltage may be different than the positive voltage used to set the first pixel in the first row). Thus, when N is greater than one, the source driver may not have to drive a voltage with a different polarity onto the source line when updating sequential rows.

After receiving a subsequent frame, in chart 520, the polarity of each pixel is switched. Nonetheless, the pattern of every two rows have the same polarity assignments is maintained. In generally, increasing from N=1 to N=2 may save power since, when updating sequential rows that have the same polarity assignments, the source driver does not need to drive the source line from to a voltage with an opposite polarity than the latent voltage. That is, when updating the first pixel on the first column or source line, the voltage polarity was positive (i.e., the latent voltage). When updating the second pixel on the first source line, the voltage polarity is still positive. Thus, the source drive only needs to change the positive latent voltage to the desire voltage which is also positive. In contrast, when updating the first pixel in the first source line of chart 505, the voltage is positive. But when updating the second pixel in the first source line, the voltage is negative. Thus, the source driver must drive the positive latent voltage to a negative desired voltage. If the voltage set when the source drive update the first pixel in the first source line was +5V and the desired voltage for the second pixel in that source line is −5V, the source driver consumes power to swing the voltage on the first source line approximately 10V. However, this voltage swing may be mitigated by using charge sharing which is discussed later.

Charts 525 and 530 illustrate that N-line inversion when N=3. Here, every three rows have the same polarity assignments. Because the source driver can avoid switching polarities for a particular source line when doing three subsequent row updates, the inversion scheme shown in charts 525 and 530 may conserve additional power relative to when N=2 as shown in charts 515 and 520.

In one embodiment, each box in charts 505-530 may represent a red, green, or blue sub-pixel in a display screen. Moreover, the first three columns or source lines may be attached to one source driver while the last three columns are attached to a second source driver. Thus, as shown in FIG. 4, the first column may be the source line for the red sub-pixel, the second columns may be the source line for the green sub-pixel, and the third columns may be the source line of the blue sub-pixel. The next three columns may be similarly assigned but are selectively coupled to a different source driver. This particular arrangement is illustrated using chart 530 where R1, G1, and B1 are coupled to Source Driver 1 and R2, G2, and B2 are coupled to Source Driver 2. However, the embodiments herein are not limited to this arrangement. Instead, the boxes in charts 505-520 may represent the polarity of a pixel that includes a plurality of sub-pixels (and a plurality of source lines). Thus, each sub-pixel in the same row may be assigned the same polarity.

Figure 6:
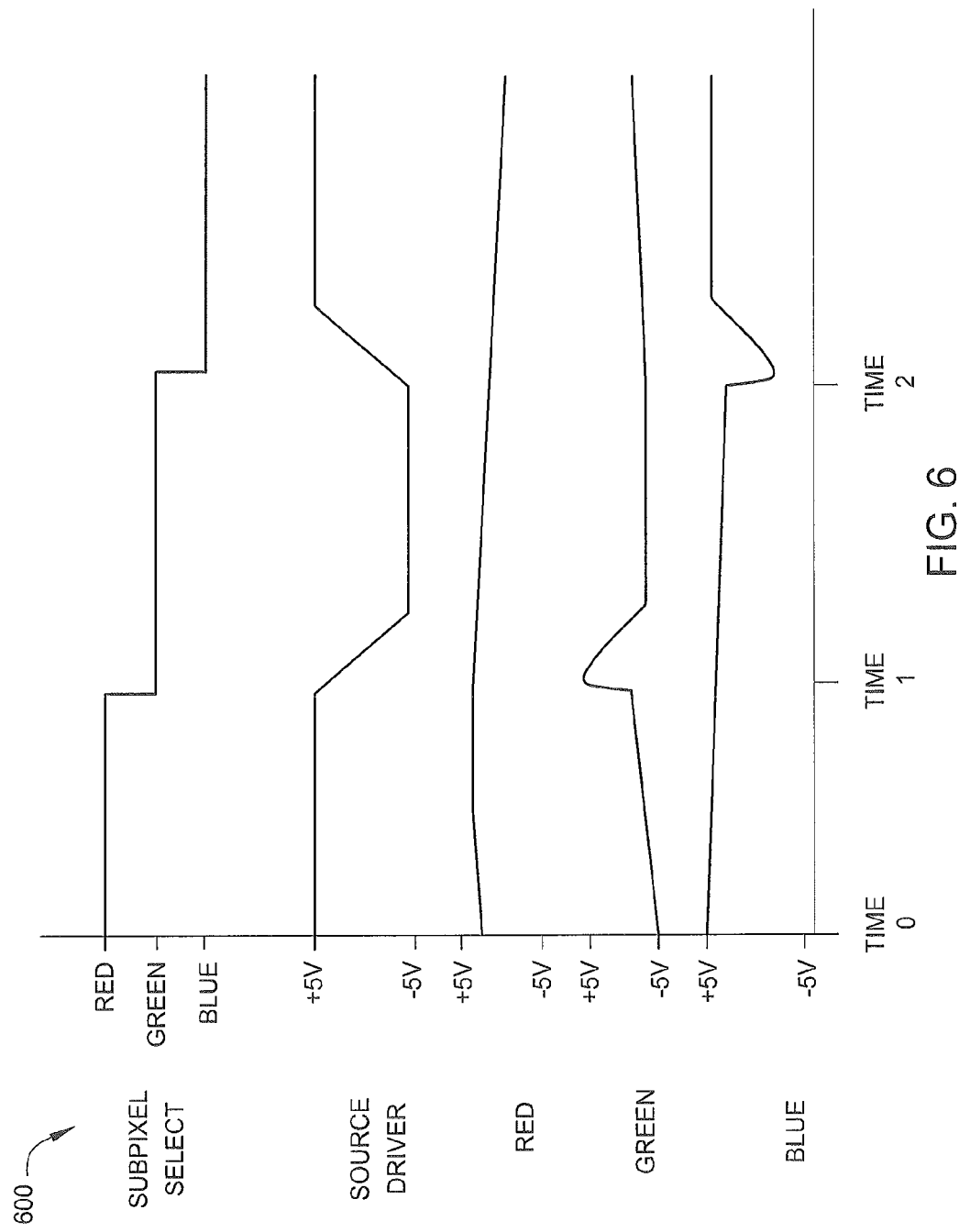
FIG. 6 is a timing diagram of the voltages in a display device, according to one embodiment described herein.

FIG. 6 is a timing diagram of voltages in a display device, according to one embodiment described herein. Specifically, diagram 600 illustrates updating the sub-pixels associated with the source drive shown in FIG. 4. For ease of explanation, assume that three sub-pixels are assigned alternating polarities to satisfy one of the inversion schemes discussed above (e.g., N-line inversion, dot inversion, frame inversion, etc.). That is, the red sub-pixel has a positive polarity, the green sub-pixel has a negative polarity, and the blue sub-pixel has a positive polarity. Moreover, in FIG. 6, assume that the source driver is merely refreshing the voltage stored by the individual sub-pixels. Because of leakage, the voltage stored across the pixels may deplete over time which affects the color displayed by the display screen. Thus, the source driver may refresh the voltage across the pixels based on newly received frame (e.g., 60 frames per second) even if those frames store the same voltage across the sub-pixels.

In conjunction with the sub-pixel select signal, the source driver (VSOURCE DRIVER) drives a particular voltage onto the source line. At Time 0, the sub-pixel select signal routes the voltage provided by the source driver to the red sub-pixel thereby causing the voltage (VRED) across the sub-pixel to rise to the same value output by the source driver. At Time 1, the sub-pixel select signal causes the display screen to route the voltage generated by the source driver to the green sub-pixel. However, because the green sub-pixel has the opposite polarity relative to the previous sub-pixel, the voltage output from the source driver must slew from the positive domain (0 to +5V) to the negative domain (0 to −5V). As shown by chart 600, the voltage on the source line associated with the green sub-pixel is slightly less than −5V resulting from leakage. As the source driver output slews, the source driver sources a current that decreases the voltage on the source line. Stated differently, the source driver consumes power in order to drive the source line to a lesser voltage than is desired. Moreover, the unnecessary voltage swing may corrupt the voltage across the sub-pixel and thus distort the image displayed by the display screen. Note that the voltages shown in FIG. 6 are exaggerated to better show the effects of leakage and the voltage spike caused by the voltage mismatch.

Eventually, the voltage output by the source driver will slew until it exceeds the voltage on the source line, thereby driving the source line and the green sub-pixel to the desired voltage (i.e., −5V). Thus, the source driver consumes power (i.e., current flows in two directions) both to decrease the voltage on the source line when the output voltage is less than the latent voltage on the source line and to increase the voltage on the source line to the desired value.

A similar waste of power may occur when setting the value on the blue sub-pixel. At Time 2, the output voltage of the source driver slews from the negative domain to the positive domain. During that time, the source driver consumes power to both decrease and increase the voltage on the source line as shown by $V_{BLUE}$.

In one embodiment, the display device may include a buffer time where the source driver is disconnected from the source lines in the display screen when slewing. The source driver may then be connected to the respective source line after the driver's output reaches the desired voltage of the source line. However, as pixel densities increase and the time for updating each individual pixel decreases, the display device may not have enough time to wait for the source drivers to slew. Accordingly, the display device may use the latent voltage stored on the source lines from the previous frame update to precharge the source driver to the latent voltage. Advantageously, doing so may require less time than waiting for the source driver to slew as well as conserve power from not having to conduct current in two directions to both decrease and increase the voltage on the source line.

Figure 7:
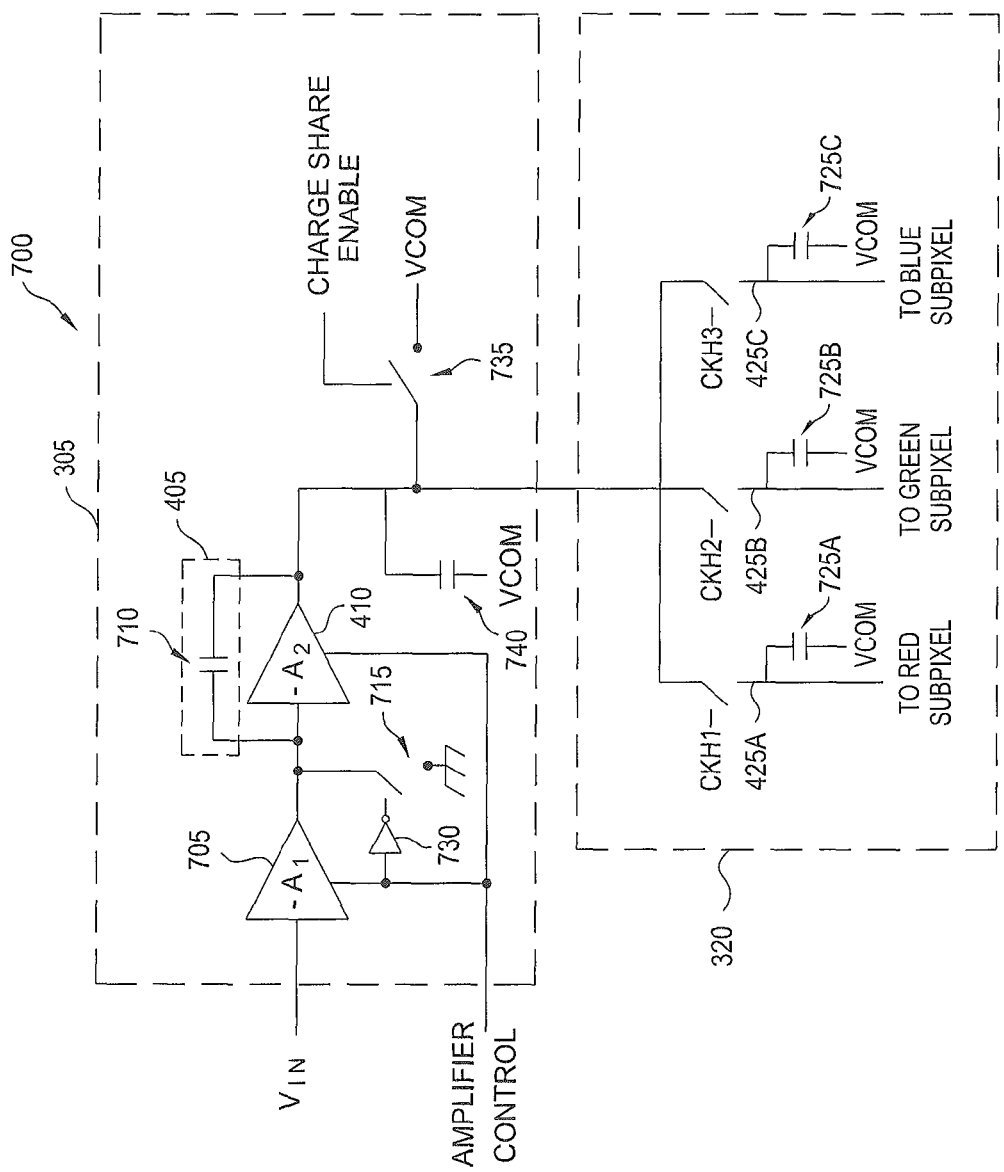
FIG. 7 is a circuit diagram of a source driver coupled to a display screen, according to one embodiment described herein.

FIG. 7 is a circuit diagram 700 of a source driver 305 coupled to a display screen 320, according to one embodiment described herein. Specifically, diagram 700 illustrates a source driver 305 that may be precharged using a source line 425 in display screen 320. Source driver 305 includes two amplifiers—amplifier 410 and amplifier 705—that are used to generate an output voltage based on an input voltage $V_{IN}$. The precharge circuitry 405 includes a compensation capacitor 710 which is used in a feedback loop to set the output voltage of the driver 305. Moreover, in one embodiment, the voltage on the source line 425 is used to precharge the compensation capacitor 710 in order to stabilize the output voltage of source driver 305. While a source line 425 precharges the capacitor 710, the amplifiers 705 and 410 may be disabled—have high output impedances. When disabled, very little current flows into, or out of, the outputs of amplifiers 705 and 410. To facilitate current flow, source driver 305 includes switching element 715 (e.g., a transistor) that couples one end of the compensation capacitor 710 to a reference voltage (shown here as ground). Doing so creates an electrical path between the reference voltage and a source line 425 that permits the charge stored in the coupled source line 425 to charge the compensation capacitor 710. For example, the inherent or parasitic capacitance of each source line 425 (modeled by the respective capacitors 725) stores a charge some of which is then transferred to the compensation capacitor 710. Generally, the inherent capacitance 725 of the source lines 425 is much greater than the capacitance of the compensation capacitor 710 in the source driver 305—e.g., two orders of magnitude larger. Although FIG. 7 shows placing the compensation capacitor in a feedback loop, precharging a capacitor located at other positions is also contemplated by this disclosure. For example, the capacitor may be located between the two amplifier stages rather than in the feedback loop of the amplifier 410 as shown.

Source driver 305 receives an amplifier control signal for disabling the amplifiers 705 and 410 and enabling the compensation capacitor 710 to be precharged. As shown here, source driver includes an inverter 730 that uses the amplifier control signal to control the switching element 715. For example, if the amplifier control signal is high, the amplifiers 705 and 410 may be enabled and the compensation capacitor 710 is disconnected from the reference voltage. Once the control signal goes low, the amplifiers 705 and 410 are disabled (i.e., switched to a high-impedance state) and the compensation capacitor 710 is coupled to the reference voltage. The amplifier control signal may be correlated to source line select signals CKH1, CKH2, and CKH3. For example, when the amplifier control signal connects one side of the compensation capacitor to the reference voltage, the source line select signal couples the other side of the compensation capacitor 710 (i.e., the output of the source driver 305) to one of the source lines 425. In this manner, the charge stored by the source line's capacitance 725 may be transferred to the compensation capacitor 710.

In one embodiment, the system 700 includes a charge share function which is used when the polarity of a source line is inverted. For example, the N-line inversion schemes shown in FIGS. 5A-5C require that the polarity of each pixel be switched at each subsequent frame. If the inversion scheme instructs source driver 305 to invert the polarity for the respective source line upon receiving a new display frame, source driver 305 would have to overcome the latent voltage stored on the columns to set the desired voltage to the new polarity. Instead of requiring source driver 305 to directly drive the sub-pixels from a negative voltage to a positive voltage (or vice versa), system 700 may use the charge share enable signal and switch 735 to short one or more of the source lines 425 (herein referred to as a "global charge share event"). In the case of an N-line inversion scheme, each source line would be shorted. Specifically, when the charge shared enable signal is high, the system 700 may use signals CKH1, CKH2, and CKH3 to couple the source lines 425 to VCOM, thereby shorting out the latent voltages. Thus, source driver 305 needs only to drive the source lines 425 from VCOM (i.e., a neutral voltage) to the negative or positive voltages rather than from a negative voltage to a positive voltage or vice versa. Doing so may reduce the power consumed by the source drivers 305 when inverting the polarity of the voltages stored in the pixels.

In one embodiment, the charge share enable signal may couple source lines 425 associated with a plurality of source drivers 305 together. Although not shown, the charge share enable signal may permit the source lines to be coupled together and share their respective charges. Assuming that there are approximately the same number of source lines 425 with positive polarity and negative polarity (and the absolute values of the voltages are about the same), interconnecting the source lines 425 will bring down the respective voltages on each source line in the display device to approximately VCOM. Moreover, although in system 700 the charge share circuitry is located on the source driver 305, this is not a requirement. Instead, in one embodiment this circuitry may be located external to the ASIC hosting the source driver 305 such as on the display screen 320.

Figure 8A:
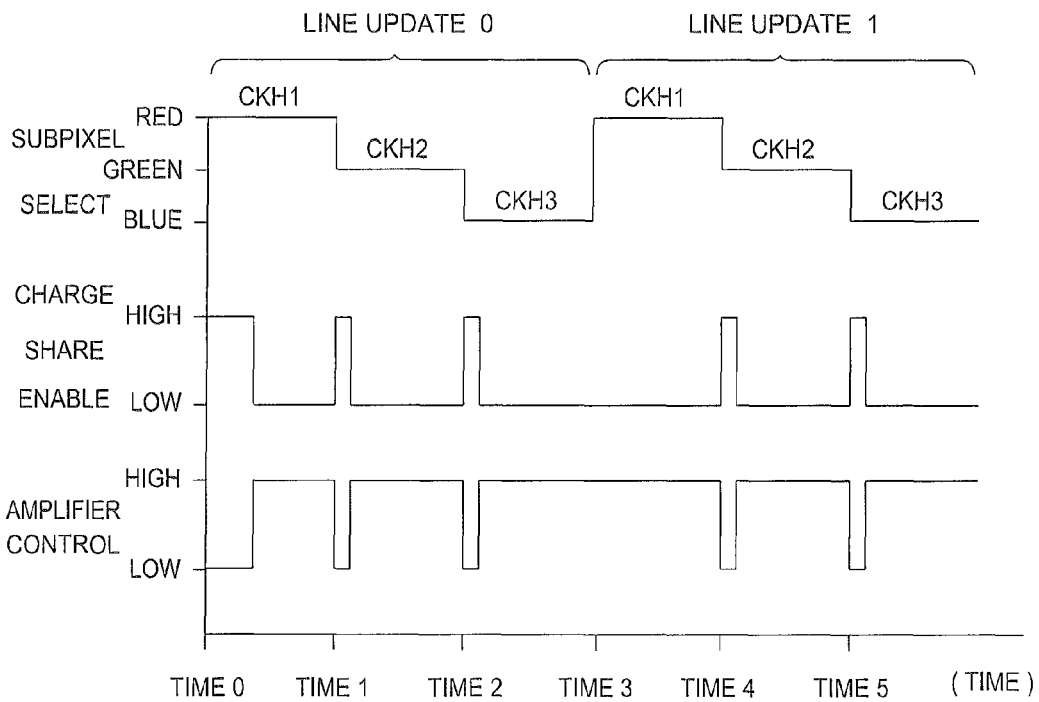
FIGS. 8A-8B are timing diagrams for updating a pixel in a display screen, according to embodiments described herein.
Figure 8B:
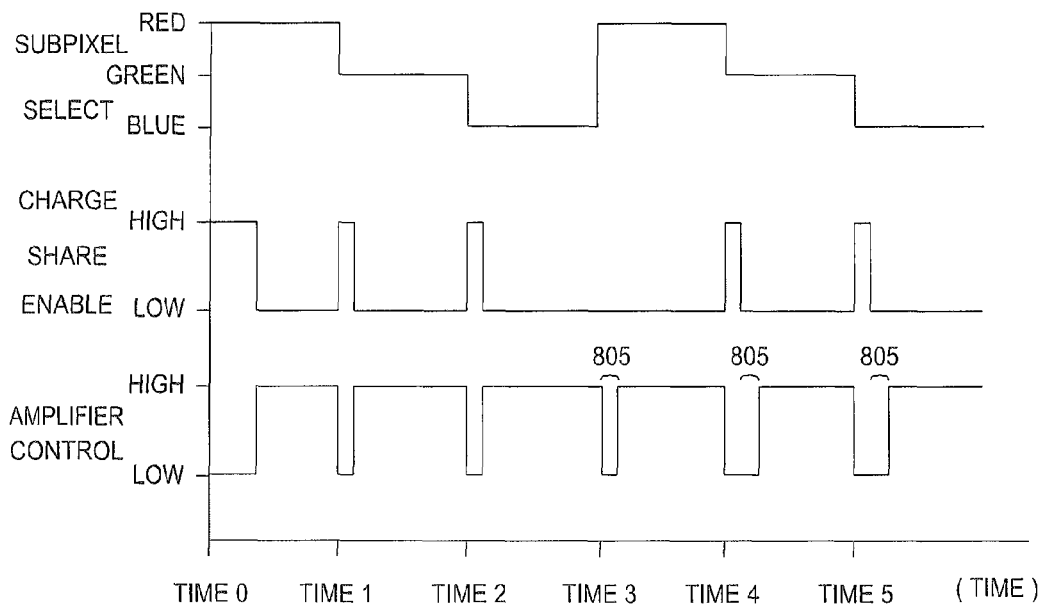

FIGS. 8A-8B are timing diagrams for updating a pixel in a display screen, according to embodiments described herein. Specifically, FIG. 8A illustrates using charge share events to reduce the amount of power consumed by the source driver when inverting polarities assigned by an inversion scheme. FIGS. 8A-8B illustrate updating the sub-pixel source lines for two subsequent line or row updates—Line Update 0 and Line Update 0. Here, assume that a single source driver (e.g., source driver 305 of FIG. 7) is selectively coupled to the red, green, and blue sub-pixel source lines. At Times 0-2, the source driver updates one row of pixels along the source lines while at Times 3-5 the source driver updates the subsequent row of pixels along the same source lines. Also assume that the display device generating the timing charts in FIGS. 8A and 8B uses an N-line inversion scheme where N is greater than or equal to two.

As each new frame is received, N-line inversion switches the polarity assignment for each of the pixels as shown in charts 505-530 of FIGS. 5A-5C. Thus, at Time 0, the charge share enable signal goes high which may short all the source lines to VCOM during a global charge share event. Specifically, the source select signals CKH1, CKH2, and CKH3 shown in FIG. 7 may connect the three sub-pixel source lines to VCOM (not shown by the CKH signals in FIGS. 8A-8B). Alternatively, the charge share enable signal may connect the three source lines represented in FIGS. 8A and 8B to the source lines of the other source drivers in the display device to discharge the latent voltage.

When performing the global charge share event, the respective amplifiers in the source drivers may be disabled by the amplifier control signal. Referring back to FIG. 7, the output of source driver 305 is also connected to VCOM during the charge share. Thus, a global charge share permits system 700 to remove latent charge stored by the inherent capacitance associated with source driver 305. However, because the output is shorted to VCOM during a global charge share event, the amplifier control signal disables the amplifiers 705 and 410 so that they do not source or sink current. Once the global charge share is complete, the charge share enable signal disconnects the source lines 425 and the output of source driver 305 from VCOM. The amplifier control signal may then enable the amplifiers 705 and 410 (i.e., the amplifier control signal goes high) to transmit the desired voltage onto the red sub-pixel source line 425A.

Returning to FIG. 8A, at Time 1, the source driver completes charging the red sub-pixel and the source line associated with the green sub-pixel is activated. As shown, the charge share signal again goes high and the amplifiers are disabled by the amplifier control signal. Here, charge share is performed to deplete the charge associated with the source driver only (referred to herein as a "local charge share event"). Because the source driver builds up charge as the driver sets the voltage for the red sub-pixel, the local charge share event performed at Time 1 depletes that charge. Specifically, the capacitance along the transmission line between the output of the amplifier 410 and the interface of the display screen 320 (modeled by capacitor 740) builds up a charge that is depleted during a local charge share event. This function may be especially useful if the polarity of the voltage set on the red sub-pixel is opposite the polarity of the voltage to be set on the green sub-pixel. For example, the polarity assignments may as shown in chart 515 where the red pixel (i.e., the first pixel on the first source line) has a positive voltage, the green pixel (i.e., the first pixel on the second source line) has a negative voltage, and the blue pixel (i.e., the first pixel on the second source line) has a positive voltage. Performing this local charge share event may conserve power since the source driver does not have to use its internal amplifiers to overcome the charge built up on the transmission line connecting the source driver to the source lines from the previous sub-pixel update. Moreover, the local charge share event prevents the amplifier of the source driver from overvoltage exposure that may occur when the source driver switches polarities. After depleting the charge, the amplifier control signal enables the amplifiers which use the compensation capacitor to drive the desired voltage onto the green sub-pixel. At Time 2, the display device may again perform a local charge share event for depleting the charge associated with the output of the source driver before updating the blue sub-pixel. Generally, a local charge share event may occur each time the source driver switches polarities.

At Time 3, the display device begins to again update the same source lines but different sub-pixels on the source lines (i.e., the second row of chart 515). For example, as shown in FIG. 4, the display device may use row select logic to select a particular gate line or row in a display screen. The display device then controls each source driver to update the pixels along the gate line before activating the next gate line in the display screen and again updating the multiple source lines coupled to the source driver. Notably, when N is equal to or greater than two, the display device does not perform a global charge share event before updating the next row of sub-pixels on the three source lines. For example, charts 515 and 525 illustrate that the first two or three rows of pixels are assigned the same polarity. Thus, when the source driver is finished updating the first row, the red source line has a positive latent voltage, the green source line has a negative latent voltage and the blue source line has a positive latent voltage. These latent voltages have the same polarity as the pixels shown in row 2 of charts 515 and 525, and thus, the source drive will not have to drive the latent voltage on the source lines from one polarity to the other polarity when performing Line Update 1. Moreover, the display device may also not need to perform a local charge share event since the polarity on the green pixel for Line Update 0 (i.e., row 1, column 3 of chart 515) has the same polarity of the red pixel in for Line Update 1 (i.e., row 2, column 1 of chart 515). Stated differently, in one embodiment, a local charge share may be performed only when a source driver updates a source line where the sub-pixel is assigned to a different polarity than the sub-pixel of the source line that was updated previously.

Similar to Time 1 and Time 2, at Time 4 and Time 5 the charge built up from the previous sub-pixel update may be depleted using a local charge share event. That is, as shown in row 2 of the first three columns in charts 515 and 525, the polarity of changes between the red and green pixels and between the green and blue pixels. In FIG. 8A however, the display device does not precharge the compensation capacitor. Instead, the output of the source driver is set to VCOM. Thus, a display device using the timing diagram in FIG. 8A may be susceptible to the voltage spikes shown in FIG. 6. Specifically, at Times 4 and 5 where Source Driver 1 transitions from driving a voltage with one polarity to driving a voltage with a different polarity, Source Driver 1 may temporarily pull down the voltage as the driver slews to the desired voltage. In such a case, the source driver may conduct current in both directions when the driver needs only to supply current in one direction (either source or sink the current) to set the desired voltage.

FIG. 8B illustrates a timing diagram where the source driver is precharged to prevent the amplifiers in the source driver from both sourcing and sinking current, thereby saving power relative to the timing diagram shown in FIG. 8A. Precharging the source driver, and more specifically, precharging the compensation capacitor may occur anytime a source driver will drive a particular voltage onto a source line that already has a latent charge or voltage from a previous pixel update. In one embodiment, the display device may precharge the source driver so long as the source line has not been subjected to a global charge share event where the latent charge has been depleted to a reference voltage (e.g., VCOM).

Because the latent voltages of the source lines was wiped using the global charge share event at Time 0, the display device may not precharge the capacitor before updating the red, blue, and green sub-pixels at Times 0, 1, and 2. However, are performing the first line update, the source lines now have a latent charge. Thus, when updating the next row of sub-pixels during the next line update, at Time 3, a precharge event 805 may occur as soon as the red sub-pixel source line is again coupled to the output of the source driver. At Time 4 and Time 5, the precharge event 805 occurs immediately following the local charge share event that depletes the charge associated with the output of the source driver.

Referring back to FIG. 7, once the charge share enable signal opens the switch 735 which decouples the output of source driver 305 from VCOM, the latent charge of the selected source line 425 flows to the compensation capacitor 710 which creates a voltage across the capacitor 710 which is determined by the predefined reference voltage coupled to the compensation capacitor 710 via switching element 715. Once the precharge event is complete, the compensation capacitor 710 is disconnected from the reference voltage and the output voltage of the source driver 305 is now set to approximately the same voltage of the sub-pixel source line. By precharging the compensation capacitor 710 using the output of the source driver 305 and a coupled source line 425, the internal slew time (shown in FIG. 6) may be increased relative to using the input voltage ($V_{IN}$) to precharge the capacitor 710.

Returning to FIG. 8B, after the precharge event 805, the source driver uses the input voltage to drive the desired voltage onto the sub-pixel source line. For example, assume that when updating the red sub-pixel source during Line Update 0, the source driver drove the voltage on the source line to 5V. Because the same polarity will be assigned to the sub-pixel in the subsequent row, when performing Line Update 1, the source driver may precharge the compensation capacitor to the latent voltage on the red source line. Because of leakage and precharging the compensation capacitor, the voltage on the source line may have fallen to, for example, 4.5V. Thus, the source driver, which is already precharged to 4.5V needs only to change the voltage on the red sub-pixel source line to the desired voltage—e.g., from 4.5V to 4.8V. However, even if the desired voltage is very different from the voltage that the source driver is precharged to, precharging the source driver does not increase the power consumed by the source driver. That is, even if the output of the source driver is precharged to 4.5V but the input signal requires that the source driver generate only 1V on the source line, the source driver would nonetheless consume the power necessary to decrease the voltage from 4.5V to 1V, regardless if the precharge event occurred. Thus, the source driver may have to slew down from the precharged voltage of 4.5V to 1V but this slewing does not consume additional power like the system shown in FIG. 6. That is, the current used to pull down the voltage is unidirectional rather than bidirectional. Accordingly, in one embodiment, a precharge event may occur even if the latent voltage on the source line is substantially different from the desired voltage so long as the polarity of the latent voltage is the same as the desired voltage. Thus, the compensation capacitor of the source driver may be precharged so long as the source lines have not been subjected to a global charge share event (i.e., the voltage is set to VCOM). In other embodiments, the display device may include logic that determines when to perform a precharge event. For example, if the latent voltage differs by more than 2V from the desired voltage, the precharge event may be skipped. However, doing so may risk the situation shown in FIG. 6 where bidirectional current flows, thereby consuming additional power.

Although FIGS. 8A and 8B illustrate using global and local charge share events, the embodiments described herein at not limited to such. The precharging discussed in FIG. 8B may be performed regardless whether a charge share event occurs. For example, precharging the compensation capacitor may be performed if neither the global nor the local charge sharing events occur, or if only one of the two different types of charge sharing events is performed.

Figure 9:
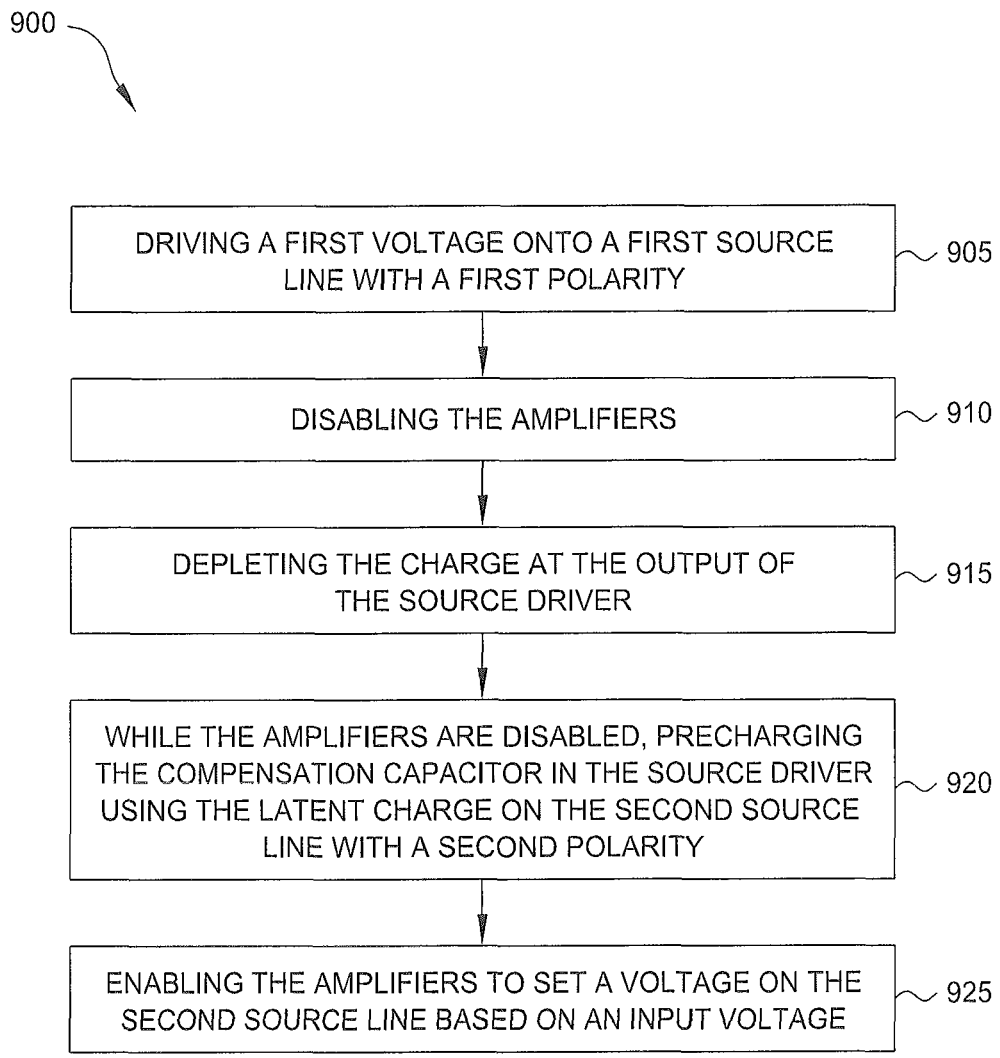
FIG. 9 is a flow chart of a method for precharging a source driver using a source line in a display screen, according to one embodiment described herein.

FIG. 9 is a flow chart of a method 900 for precharging a source driver using a source line in a display screen, according to one embodiment described herein. Method 900 begins at block 905 where a source driver drives a first desired voltage onto a first source line. For example, the source driver may be tasked with driving a plurality of source lines in a display screen. The polarity of the voltages assigned to the individual pixels may be assigned based on a selected inversion scheme. For example, the pixels associate with each row or column in a display device may be assigned the same polarity (i.e., all positive voltage or all negative voltages). In other schemes, the pixels in a particular row or column are assigned voltage values with different polarities as shown in FIGS. 5A-5C.

In one embodiment, each of the source drivers may be selectively coupled to three source lines that are coupled to respective sub-pixels. Each of the sub-pixel source lines (or each of the sub-pixels) may be assigned a different polarity. For example, the red sub-pixel may have a positive voltage (e.g., +2.2V), the green sub-pixel may have a negative voltage (e.g., −4V), and the blue sub-pixel may have a positive voltage (e.g., +5V). Thus, when updating the sub-pixels, the source driver may first drive a positive voltage on the first source line, a negative voltage on the second source line, and a positive voltage on the third source line. As shown by FIG. 6, when slewing between the negative and positive domains, the source driver may alter the voltage stored by the sub-pixels by changing the voltage of the source line to an undesired voltage. In addition to possibly corrupting the data stored by the sub-pixel, the voltage spike shown in FIG. 6 may cause the source drive to consume power to first pull down the voltage on the source line only to then raise the voltage back to a desired voltage. Instead, the display device may precharge the source driver to the latent voltage on the source line to avoid consuming additional power and corrupting the data stored in the sub-pixel.

At block 910, the source driver disables the amplifiers by placing the amplifiers into a high-impedance state where the amplifiers do not source or sink current. While the amplifiers are disabled, at block 915, the display device may perform a local charge share event to remove latent charge at the output of the source driver resulting from driving a previous source line. For example, if the source driver generated a positive voltage onto the first source line, performing the charge share event brings the output voltage of the source driver to VCOM (e.g., from 2.2V to 0V). However, in one embodiment, block 915 may be omitted if the output of the source driver does not have a latent charge from driving a previous source line or if the source driver is driving a voltage with the same polarity onto the next source line.

At block 920, the display device may precharge the source driver using the latent charge or voltage on a second source line in the display panel. For example, if the first source line was charged to a negative voltage, the charge share event at block 915 may adjust the output voltage to VCOM. When precharging, the output voltage of the source driver is raised from VCOM to the latent voltage (e.g., a positive voltage) of the second source line. In one embodiment, precharging the source driver may include charging a compensation capacitor in the feedback loop of an amplifier as shown in FIG. 7. In this manner, the voltage swing from the negative voltage driven onto the first source line to the positive voltage stored by the second source line may occur when the amplifiers are disabled and the source driver is not consuming power.

While method 900 discusses the example when the source lines have voltages in different domains, the invention is not limited to such. That is, even if the first and second source lines store voltages with the same polarity, precharging the source driver may still prevent the voltage spike discussed earlier. For example, assume the source driver drove 1V onto the first source line and is instructed to drive 5V onto the second source line. Because the first and second source lines are assigned to the same polarity, the display device may skip block 920 where the output charge of the source driver is depleted. Furthermore, assuming the latent charge on the second source line is 5V, when precharging, the output voltage of the source drive is pulled up to 5V. This avoids the possibility that the previous output of the source driver (i.e., 1V) would pull down the 5V on the second source line when the source driver is slewing to the desired 5V. Thus, the embodiments discussed herein may be used even when consecutive source lines that are driven by the same source driver are assigned the same polarity.

At block 925, the source driver may enable the amplifiers which then, in combination with the compensation capacitor, change the output of the source driver to the desired voltage. For example, the source driver may be precharged to the same voltage as that of the second source line (e.g., 4.7V). Once the precharge event is over, the source driver may slew until the desired voltage (e.g., 5V) is driven onto the second source line. However, when the source driver slews from the precharge voltage to the desired voltage, the current provided by the source driver is unidirectional (i.e., either current is sourced or sunk, but not both). Thus, even if the precharge voltage varies significantly from the desired voltage, the source driver does not waste power driving the correct voltage since the power would have needed to change the source line's latent voltage to the desired voltage regardless of whether the precharge stage was performed.

CONCLUSION

In one embodiment, a source driver in a processing system may be selectively coupled to a plurality of source lines (or column lines) on a display screen. Using the source lines, the source driver sets a voltage associated with a pixel on the display screen which determines the color displayed by the pixel. When the source driver sets voltages onto subsequent source lines, the input device may precharge the source driver using a latent voltage stored on the source line. That is, if the source line was previously driven to a particular voltage by the source driver, the input device uses that latent voltage to precharge the output of the source driver to the same voltage. The source driver may then adjust its output to desired voltage—i.e., the pixel voltage stipulated by a received display frame. For example, if the latent voltage on the source line is 4.5V, after the precharge stage, the output of the source driver is also set at 4.5V. The source driver then slews to the desired voltage (e.g., 5V) thereby driving the desired voltage onto the pixel coupled to the source line.

Precharging the source driver may reduce the power consumed by the source driver. For example, if the desired voltage for the pixel is 5V but the current output voltage of the source driver is 0V, the source driver may begin to slew to the 5V. If the source line with a latent voltage (e.g., 4.5V) is coupled to the source driver while the source driver is slewing, the driver may pull down the latent voltage on the source line. Eventually, the output voltage of the source driver will exceed the voltage of the source line and drive the source line to the desired 5V. Nonetheless, while slewing, the source driver consumes energy to both drive down the voltage and drive up the voltage on the source line. Driving down the voltage to only drive up the voltage is unnecessary and wastes power. Precharging the source driver may avoid wasting power by setting the output voltage of the driver to the latent voltage of the source line.

Thus, the embodiments and examples set forth herein were presented in order to best explain the embodiments in accordance with the present technology and its particular application and to thereby enable those skilled in the art to make and use the invention. However, those skilled in the art will recognize that the foregoing description and examples have been presented for the purposes of illustration and example only. The description as set forth is not intended to be exhaustive or to limit the invention to the precise form disclosed.

In view of the foregoing, the scope of the present disclosure is determined by the claims that follow.

We claim:

1. A method for updating a display device, the method comprising:
   driving a first voltage on a first source line in the display device using an amplifier in a source driver, wherein the source driver comprises a first amplifier stage coupled to a second amplifier stage, wherein the second amplifier stage comprises the amplifier;
   after decoupling the source driver from the first source line, disabling the amplifier;
   while the amplifier is disabled, coupling the source driver to a second source line in the display device, wherein the second source line was previously charged to a latent voltage, wherein the latent voltage alters a charge stored in precharge circuitry that comprises a capacitive element used to compensate the amplifier, wherein a first end of the capacitive element is directly coupled to a node between an output of the first amplifier stage and an input of the second amplifier stage and a second end of the capacitive element is directly coupled to an output of the amplifier; and
   after altering the charge, enabling the amplifier such that the output of the amplifier drives a second voltage on the second source line.

2. The method of claim 1, further comprising:
   while altering the charge, coupling the precharge circuitry to a reference voltage; and
   decoupling the precharge circuitry from the reference voltage when driving the second voltage on the second source line.

3. The method of claim 2, wherein, while altering the charge, the second source line, the precharge circuitry, and the reference voltage form an electric path through which charge flows.

4. The method of claim 1, wherein the first and second source lines are associated with respective sub-pixels of a color pixel in the display device.

5. The method of claim 1, further comprising: receiving respective input signals at the source driver for driving the first and second voltages, wherein the amplifier and the precharge circuitry amplify the respective input signals to drive the first and second voltages.

6. A display driver, comprising:
   a source driver configured to selectively couple to a first source line and a second source line in a display panel, the source driver comprising:
      first and second amplifier stages coupled together, wherein the second amplifier stage comprises an amplifier, wherein the source driver is configured to drive a first voltage on the first source line and a second voltage on the second source line using the amplifier;
      precharge circuitry that comprises a capacitive element used to compensate the amplifier, wherein a first end of the capacitive element is directly coupled to a node between an output of the first amplifier stage and an input of the second amplifier stage and a second end of the capacitive element is directly coupled to an output of the amplifier; and
      amplifier control logic configured to disable the amplifier after the first voltage is driven onto the first source line and the source driver is decoupled from the first source line,
      wherein, while the amplifier is disabled, the source driver is configured to alter a charge stored in the precharge circuitry based on a latent voltage previously driven onto the second source line,
      wherein, after altering the charge in the precharge circuitry, the amplifier control logic is configured to enable the amplifier such that the output of the amplifier drives the second voltage onto the second source line.

7. The display driver of claim 6, further comprising:
   a switch element configured to, while the source drive alters the charge stored in the precharge circuitry, couple the precharge circuitry to a reference voltage and decouple the precharge circuitry from the reference voltage when driving the second voltage on the second source line.

8. The display driver of claim 7, wherein, while altering the charge, the second source line, the precharge circuitry, and the reference voltage form an electric path through which charge flows.

9. The display driver of claim 6, wherein the first and second source lines are associated with respective sub-pixels of a color pixel in a display device.

10. The display driver of claim 6, wherein the source driver is configured to receive respective input signals for driving the first and second voltages, wherein the amplifier and the precharge circuitry amplify the respective input signals to drive the first and second voltages.

11. A display device, comprising:
    a display panel, comprising:
       a first source line,
       a second source line, and
       a selection element, and
    a source driver, wherein the source driver is selectively coupled to the first and second source lines via the selection element, the source driver comprising:
       first and second amplifier stages coupled together, wherein the second amplifier stage comprises an amplifier configured to drive a first voltage on the first source line and a second voltage on the second source line;
       precharge circuitry that comprises a capacitive element used to compensate the amplifier, wherein a first end of the capacitive element is directly coupled to a node between an output of the first amplifier stage and an input of the second amplifier stage and a second end of the capacitive element is directly coupled to an output of the amplifier; and
       amplifier control logic configured to disable the amplifier after the first voltage is driven onto the first source line and the source driver is decoupled from the first source line using the selection element,
       wherein, while the amplifier is disabled, the selection element is configured to couple the second source line to the precharge circuitry to alter a charge stored in the precharge circuitry based on a latent voltage previously driven onto the second source line,
       wherein, after altering the charge in the precharge circuitry, the amplifier control logic is configured to enable the amplifier such that the output of the amplifier drives the second voltage onto the second source line.

12. The display device of claim 11, the source driver comprising:
a switch element configured to, while the source drive alters the charge stored in the precharge circuitry, couple the precharge circuitry to a reference voltage and decouple the precharge circuitry from the reference voltage when driving the second voltage on the second source line.

13. The display device of claim 12, wherein, while altering the charge, the second source line, the precharge circuitry, and the reference voltage form an electric path through which charge flows.

14. The display device of claim 11, wherein the first and second source lines are associated with respective sub-pixels of a color pixel in the display device.

* * * * *